United States Patent
Bardini et al.

(10) Patent No.: US 11,294,883 B2
(45) Date of Patent: Apr. 5, 2022

(54) METHOD FOR MERGING DATA INTO A DATABASE TABLE BY LOCKING DATA IDENTITIES IN THE DATABASE TABLE THAT ARE ALSO PRESENT IN A TEMPORARY COPY OF THE DATABASE TABLE AND EXECUTING UPDATE AND IMPORT FUNCTIONS

(71) Applicant: SIEMENS AKTIENGESELLSCHAFT, Munich (DE)

(72) Inventors: Matteo Bardini, Genoa (IT); Andrea Boero, Genoa (IT); Davide Mini, Genoa (IT)

(73) Assignee: Siemens Aktiengesellschaft, Munich (DE)

( * ) Notice: Subject to any disclaimer, the term of this patent is extended or adjusted under 35 U.S.C. 154(b) by 343 days.

(21) Appl. No.: 14/487,305

(22) Filed: Sep. 16, 2014

(65) Prior Publication Data
US 2015/0081652 A1    Mar. 19, 2015

(30) Foreign Application Priority Data
Sep. 16, 2013  (EP) ..................... 13184492

(51) Int. Cl.
*G06F 16/23* (2019.01)
*G06F 16/22* (2019.01)

(52) U.S. Cl.
CPC ...... *G06F 16/2365* (2019.01); *G06F 16/2282* (2019.01); *G06F 16/2379* (2019.01)

(58) Field of Classification Search
CPC ......... G06F 17/30371; G06F 17/30339; G06F 17/30377

(Continued)

(56) References Cited

U.S. PATENT DOCUMENTS

| 7,016,903 B1 | 3/2006 | Thusoo et al. |
| 7,251,650 B2 | 7/2007 | Jin et al. |

(Continued)

FOREIGN PATENT DOCUMENTS

| CN | 101233505 A | 7/2008 |
| CN | 102193991 A | 9/2011 |
| CN | 102663117 A | 9/2012 |
| CN | 102193991 B | 8/2014 |

OTHER PUBLICATIONS

Bruni, Paolo, Mike Bracey, Rubina Goolamhussen, Ravikumar Kalyanasundaram, Bart Steegmans, "DB2 9 for z/OS : resource serialization and concurrency", IBM Redbooks publication, Dec. 22, 2009.*

(Continued)

*Primary Examiner* — Alicia M Antoine
(74) *Attorney, Agent, or Firm* — Laurence A. Greenberg; Werner H. Stemer; Ralph E. Locher

(57) ABSTRACT

A method and a system import data into a table. The method includes providing the table with data identities and a primary key assigned to each of the data identities. A temporary copy of the table is provided and contains a data identity to be merged into the table. The table structure of the table and of the temporary copy is determined and the determined table structure is compared to the table structure of the temporary copy to decide which data identities have to be updated and/or imported. In the temporary copy a new column contains a final primary key of the related data identity for its transfer into the table. The data identities in the table that are present in the temporary copy are locked and an update function for the data identities having the same primary key in both the table and the temporary copy are executed.

6 Claims, 2 Drawing Sheets

(58) Field of Classification Search
USPC ........................................................ 707/704
See application file for complete search history.

(56) References Cited

U.S. PATENT DOCUMENTS

| | | | | |
|---|---|---|---|---|
| 7,702,686 | B2 | 4/2010 | Meijer et al. | |
| 8,078,570 | B2* | 12/2011 | Chen | G06F 17/30592 |
| | | | | 707/600 |
| 2003/0055822 | A1* | 3/2003 | Yu | G06F 17/30371 |
| | | | | 707/999.006 |
| 2009/0187599 | A1* | 7/2009 | Bruso | G06F 16/22 |
| 2010/0280991 | A1 | 11/2010 | Chen et al. | |
| 2013/0031051 | A1* | 1/2013 | Mujumdar | G06F 16/273 |
| | | | | 707/626 |
| 2013/0246340 | A1* | 9/2013 | Bender | G06F 16/283 |
| | | | | 707/602 |
| 2014/0317047 | A1* | 10/2014 | Wang | G06F 17/30377 |
| | | | | 707/607 |
| 2014/0317048 | A1* | 10/2014 | Wang | G06F 17/30377 |
| | | | | 707/607 |
| 2015/0153725 | A1* | 6/2015 | Matheny | G05B 19/4155 |
| | | | | 700/117 |

OTHER PUBLICATIONS

Ali, Arshad, "Using MERGE in SQL Server to insert, update and delete at the same time", 2009, Englewood Solutions, LLC, https://www.mssqltips.com/sqlservertip/1704/using-merge-in-sql-server-to-insert-update-and-delete-at-the-same-time/ (Year: 2009).*

Deepak, "Merge Statement—SQL Server 2008", Jan. 11, 2009, http://sql-articles.com/articles/dba/merge-statement-sql-server-2008 (Year: 2009).*

Farley, Rob, "MERGE gives better OUTPUT options", Jun. 12, 2012, http://blogs.lobsterpot.com.au/2012/06/12/merge-gives-better-output-options/ (Year: 2012).*

Patel, Chirag, Merge Statement in SQL Server to apply UPSERT (Update, Insert and Delete), Jan. 24, 2013, https://sqlserverandbi.wordpress.com/2013/01/24/merge-statement-in-sql-server-to-apply-upsert-update-insert-and-delete-2/(Year: 2013).*

Snider, Dallas, "Using the SQL Server MERGE Statement to Process Type 2 Slowly Changing Dimensions", Feb. 18, 2013, https://www.mssqltips.com/sqlservertip/2883/using-the-sql-server-merge-statement-to-process-type-2-slowly-changing-dimensions/ (Year: 2013).*

Microsoft, "SQL Server 2012 Transact—SQL DML Reference", SQL Server 2012 Books Online, 263 pp (Year: 2012).*

Sansoterra, Michael, "TechTip: MERGE DB2 Data to SQL Server 2008", Oct. 8, 2008, 8 pp (Year: 2008).*

Dougher et al.: "Unique key", Wikipedia, the free encyclopedia, Sep. 1, 2013 (Sep. 1, 2013) pp. 1-5 XP055102325, Internet: URL:http://en.wikipedia.org/w/index.php?title=Unique_key&oldid=571010506; [retrieved on Feb. 14, 2014].

Lfeagan et al.; "Identity Column", Wikipedia, the free encyclopedia, Jul. 11, 2012 pp. 1-2; XP055102332, Internet: URL: http//en.wikipedia.org/w/index.php?title=Identity_column&oldid=501676515; [retrieved on Feb. 14, 2014].

* cited by examiner

FIG 3

TEMPORARY_TBL_CHILD (8)

| PK | NAME | FATHER_PK | PK_NEW | OPER. |
|----|------|-----------|--------|-------|
| 1 | CH_1 | 5 | | U |
| 2 | CH_2 | 5 | | U |
| 3 | CH_3 | 5 | | I |

TBL_CHILD (6)

| PK | NAME | FATHER_PK |
|----|------|-----------|
| 1 | CH_1 | 7 |
| 2 | CH_2 | 7 |
| ... | | |

FIG 4

TEMPORARY_TBL_CHILD (8')

| PK | NAME | FATHER_PK | PK_NEW | OPER. |
|----|------|-----------|--------|-------|
| 1 | CH_1 | 7 | | U |
| 2 | CH_2 | 7 | | U |
| 3 | CH_3 | 7 | | I |

TBL_CHILD (6)

| PK | NAME | FATHER_PK |
|----|------|-----------|
| 1 | CH_1 | 7 |
| 2 | CH_2 | 7 |
| ... | | |

FIG 5

TEMPORARY_TBL_CHILD (8')

| PK | NAME | FATHER_PK | PK_NEW | OPER. |
|----|------|-----------|--------|-------|
| 1 | CH_1 | 7 | 1 | U |
| 2 | CH_2 | 7 | 2 | U |
| 3 | CH_3 | 7 | 3 | I |

TBL_CHILD (6')

| PK | NAME | FATHER_PK |
|----|------|-----------|
| 1 | CH_1 | 7 |
| 2 | CH_2 | 7 |
| 3 | CH_3 | 7 |

METHOD FOR MERGING DATA INTO A DATABASE TABLE BY LOCKING DATA IDENTITIES IN THE DATABASE TABLE THAT ARE ALSO PRESENT IN A TEMPORARY COPY OF THE DATABASE TABLE AND EXECUTING UPDATE AND IMPORT FUNCTIONS

CROSS-REFERENCE TO RELATED APPLICATION

This application claims the priority, under 35 U.S.C. § 119, of European application EP 13184492.0, filed Sep. 16, 2013; the prior application is herewith incorporated by reference in its entirety.

BACKGROUND OF THE INVENTION

Field of the Invention

The present invention relates to a method and a system for importing data into a database table with constraints consistency analysis and customized merge parameters.

A known method and system for storing data identities in a database structure, e.g. in the database structure of a SQL server, includes a storing value in the fields of a table having several records. The fields may be of various data types such as char, varchar, nvarchar, decimal, integer, real, and the like. Each data type has its own size which can be predetermined or variable. For example, a 'varchar' or 'nvarchar' data type is adapted to store a value with a variable size while 'char', 'decimal', and 'integer' data types store a value with a fixed size.

In this respect, a database managing system (DBMS) allocates memory space of non-constant size for the fields having the data-type 'nvarchar'. In some known implementation, for avoiding memory waste caused by using a field with a constant size, the database managing system allocates dynamically different sizes of the memory space, depending on the size of actual data to be stored, for instance depending on an application writing and reading the database.

However, a problem permanently existing in an industrial environment of a manufacturing execution system (MES) is the problem of inserting/merging data between different databases which are subject to physical and/or logical and/or application-caused constraints relating to the data persistency. In fact, in such scenarios a raw copy of the data identities between two databases would not achieve the desired result of a merged database because the existing constraints would not be adapted accordingly and any foreign key relations would not be preserved.

During the creation of the database architecture a large amount of relations between data identities and/or data tables are not engineered in this phase, but are often introduced at a development phase of (database) applications when logical relations of the database applications are introduced. The logical relations are therefore not reflected physically in the database structure. This kind of relations (one could also refer to them as logical constraints) usually are not canonical relations, but they have necessarily to be considered during an import/merge procedure if the data coherence is intended to be maintained.

Finally, the import/merge procedure has to run without disabling the data constraints analysis and triggers what is a strict condition necessary in a real environment where it can be supposed that other data operations involving different data from the data to be merged/imported will be carried out coincidently. Further, it has to be kept in mind that the database in an industrial environment with very often huge data read/write events must remain accessible and unlocked except for the data identities involved in the merge/import operation.

Nowadays, this goal can't be reached without manual intervention changing one by one each value or identify field by field in the new database or in the final target database.

Despite the fact that all major database engines provide import/export utilities, it has to be stated that none of them consider both the data consistency analysis and the possibility to specify custom logic for the purpose of the merge/import operation. These database engines therefore delete the previous data or require clean tables in order to prevent possible failure. Furthermore, database engine regularly include Backup/Restore functionalities but they are useless for merging data identities since these database engines don't analyze properly the identity field and other relations of the database, thereby causing possible data corruptions and inconsistencies in case of the presence to data collisions. Therefore, the problem related to the fields of data identities and other constraints during merge/import operations are currently resolved satisfactorily.

SUMMARY OF THE INVENTION

Accordingly, the present invention has the objective to provide a method and a system for importing/merging data into a database table with constraints consistency analysis and customized merge parameters thereby avoiding data corruptions and inconsistencies.

With respect to the method, the objective is achieved according to the present invention by a method for merging data into a database table with constraints consistency analysis and customized merge parameters. The method includes providing the table with data identities and a primary key assigned to each of the data identities. A temporary copy of the table is generated and contains at least one data identity to be merged into the table. The table structure of the table and the table structure of the temporary copy are determined and the determined table structure is compared to the table structure of the temporary copy in order to decide which data identities have to be updated in the table only and which data identities have to be imported. A temporary copy of a new column is created and contains a final primary key of the related data identity for its transfer into the table, thereby assigning the same primary key to the data identity in the temporary copy if the data exists already in the table. A new primary key is assigned to the data identity in the temporary copy if the data identity is not present yet in the table. The data identities in the table that are present in the temporary copy are locked and an update function for the data identities having the same primary key in both the table and the temporary copy are executed. An import function for the data identities having a newly assigned primary key comprised in the new column of the temporary copy is also executed. The locked data identities are unlocked after the successful execution of the updating and the importing function.

With respect to the system, the objective is achieved according to the present invention by a system for importing data into a database table with constraints consistency analysis and customized merge parameters. The system contains the table with data identities and a primary key assigned to each of the data identities. A temporary copy of this table having at least one data identity to be merged into the table is created. A logic instance determines the table structure of the table and the table structure of the temporary copy and compares the determined table structure to the table structure of the temporary copy in order to decide which data identities have to be updated in the table only and which data identities have to be imported. The logic instance creates in the temporary copy a new column containing a new primary key of the related data identity for its transfer into the table, thereby assigning the same primary key to the data identity in the temporary copy if the data exists already in the table and assigning a new primary key to the data identity in the temporary copy if the data identity is not present yet in the table. The logic instance locks the data identities in the table that are present in the temporary copy and executes an update function for the data identities having the same primary key in both the table and the temporary copy and executes an import function for the data identities having a newly assigned primary key comprised in the new column of the temporary copy. The logic instance unlocks the locked data identities after the successful execution of the updating and the importing function.

Thanks to the analysis of the table structure being based on the physical and the logical relation, the method and the system merge actually the data entities of a copy of the original database filled with the data identities to be merged without corrupting the old data identities and the final data identities in the target table. The creation of the new column allows the determination of the desired behavior for each of the data identities present in the temporary copy during the table merger operation. The comparison also assists in the solution of the problem of incomplete table structures in the target table since for example physical constraints have been introduced in the temporary copy only since the original relations are integrated with application-logical relations. The chosen merge behavior (either a simple update of an already existing data identity or the import of a new data identity yet not existing in the target table) becomes particularly useful in a maintenance/update condition when an administrator needs to modify online (on the flight) some data identities with absolutely being sure that all data identities not involved in the merge operation will be left with integrity.

In a preferred embodiment of the present invention, the determination of the table structure of the table may include the determination of physical constraints already defined in the table structure and/or the determination of logical constraints which had been defined during the development of a database application. Therefore, the consistency of any relation of data identities can be maintained when running the merge operation.

For the purpose of the automated merge operation, a second column may be added to the temporary copy; the second column containing information on whether the data identity is a target for the update function or for the importing function.

In order to guarantee the consistency of the data identities during the merge operation of a child table related to a father table, the temporary copy may be a temporary copy of a child table being in relation with a father table, wherein the relation is entered into the child table for all of its data identities prior to the merge operation.

The accompanying drawings which are included to provide a further understanding of the disclosure and are incorporated in and constitute a part of this application illustrate preferred but not limiting embodiment(s) of the disclosure. They serve to explain the principle of the disclosure together with the description.

Other features which are considered as characteristic for the invention are set forth in the appended claims.

Although the invention is illustrated and described herein as embodied in a method and a system for merging data into a database table with constraints consistency analysis and customized merge parameters, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE SEVERAL VIEWS OF THE DRAWING

FIG. 3 is a schematic illustration showing a child table and a temporary copy of the child table prior to the merging operation;

FIG. 4 is a schematic illustration showing the child table and the modified temporary copy of the child table prior to the merging operation; and FIG. 5 is a schematic illustration showing the child table and the modified temporary copy of the child table during/after the merging operation.

DETAILED DESCRIPTION OF THE INVENTION

Figure 1:
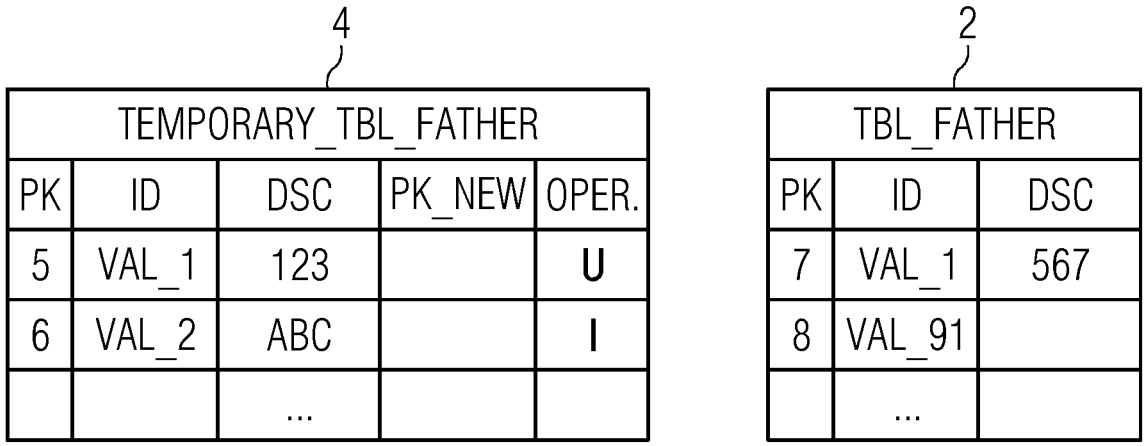
FIG. 1 is a schematic illustration of a father table and a temporary copy of the father table prior to a merging operation according to the invention.

Referring now to the figures of the drawings in detail and first, particularly to FIG. 1 thereof, there is shown schematically a main father table 2 and a temporary copy 4 of the main father table 2. The main father table 2 contains three columns in the present example: A first column PK which contains a primary key, a second column ID containing data identities and a third column DSC containing an effective value of the data identity. The temporary copy 4 of the main father table 2 contains five columns wherein the first three columns are structure-wise identical with the three columns of the main father table 2. The fourth column PK_NEW contains the new primary key for the respective data identity prior to the merging operation. The fifth column OPER contains the kind of merging operation which is executed during the merging operation.

The temporary copy 4 contains currently all the data entries that have to be merged into the main father table 2. A comparison operation is executed among the data structure of the main father table 2 and the temporary copy 4 wherein an analysis is made on the data identities present in either of the tables 2, 4. For the first data line in the temporary copy 4, the same data identity VAL_1 is present in both tables 2, 4. Therefore, the merging operation for this data identity VAL_1 requires an update operation U as marked in the fifth column OPER. For the second data line in the temporary copy 4, the data identity VAL_2 is not present in the main father table 2. Therefore, the merging operation for this data identity VAL_2 requires an import operation I as also marked in the fifth column OPER.

Figure 2:
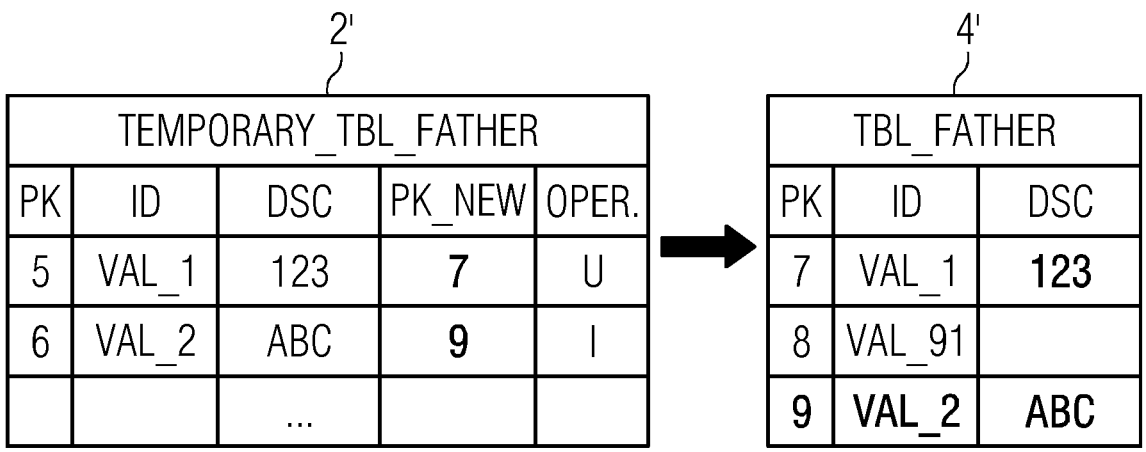
FIG. 2 is a schematic illustration of the father table and a modified temporary copy of a table database during/after the merging operation.

In order to execute the merging operation, the data identities present in the fourth column PK_NEW of the temporary copy 4 will get a new primary key assigned prior to the merging operation as this is shown in FIG. 2 for the now modified temporary copy 2'. For the data identity VAL_1 the new primary key "7" is assigned since this corresponds to the primary key of this data identity already present in the main father table 2. For the data identity VAL_2 a completely new primary key "9" has to be assigned since this data identity is yet not present in the main father table 4 and the next available primary key has been identified due to the comparison operation executed above.

During the merging operation, the data for the data identities VAL_1 and VAL_2 are locked in both the modified temporary copy 4' and the main father table 2. In other words, the data entry for the data identity VAL_91 in the main father table 2 is not locked at any time during the merging operation and can be therefore still permanently accessed. The merging operation—illustrated by the arrow in FIG. 2—leads now to an update of the effective value for the data identity VAL_1 which changes from value "567" to the value "123". The effective value and the primary key for the data identity VAL_91 remains untouched because the data identity VAL_91 is not subject to the merging operation. The data identity VAL_2 the effective value "ABC" given in the temporary copy 2 has been established in the final merged main father table 4' after the merging operation. The primary key "9" has been established in the final merged main father table 4' for this data identity as this has been established this way in the modified temporary copy 4'.

After the execution of the merging operation, all data identities involved in the merging operation are unlocked and the final merged main father table 4' is now operationally relaunched for its use in the normal operation, for example a production environment controlled by a manufacturing execution system.

Therefore, the establishment of the same data structure for both the temporary copy 4 and main father table 2 wherein the temporary copy 4 contains the data identities to be merged into the main father table 2 enables the execution of the merging operation without the requirement to provide any information regarding the data identities to be merged. The temporary copy thereby receives its entries for example from another database that has been operative in another part of a manufacturing execution system and has collected data for example from a second manufacturing line while the main target table so far collected data from a first manufacturing line. Therefore, some of the data identities could be present in both tables and some, of course, not.

The comparison operation is therefore used as a kind of a support configuration to define all the constraints that have to be observed in the merging operation to maintain the consistency of the data. These constraints can be of a physical nature already defined in the table structure or of a logical nature being incorporated during the application development but never specified in the table structure. The comparison operation therefore specifies the criteria for which the data will be eventually merged. The physical constraints are therefore extracted automatically during the comparison while the logical constraints should be specified by the system operator in charge of the merging operation.

An example for the observation of a logical constraint is given in the merging operation illustrated by FIGS. 3 to 5. In FIG. 3, a child table 6 and its temporary copy 8 are shown. The child table 6 is linked logically to the main father table 2 by the assignment (logical constraint) that the primary key of the data identities—here titled NAME—in the child database 6 have the effective value "7" of the respective primary key in the main father table 2.

The temporary copy 8 shown in FIG. 3 contains three data identities whereupon only the first two are also present in the child table 6. This leads to an update operation U for the first two data identities while the third entry in the temporary copy 8 has no equivalent in the child table 6 leading to an import operation I for the merging operation.

While the entry for the primary key of the father table FATHER_PK in the temporary copy 8 in FIG. 3 has the value of "5", the logical restraint has already been considered in the modified temporary copy 8' in FIG. 4. All data entries have the assigned primary key of the father table which value is "7" (compare the small arrows in the modified temporary copy 8').

FIG. 5 now represents the resulting modified temporary copy 8' and the final child table 6' after the merging operation. Prior to the merging operation, the data identities in the temporary copy 8 also get the new primary key of the child table assigned which is for example "3" for the data identity CH_3 which is currently not present in the child table 6. After the merging operation, all data entities in the final child table 6' have the primary key of the father table with the value of "7" according to the logical constraint.

Thanks to the analysis of the table structure being based on the physical and the logical restraints, the method explained above merges actually the data entities of a copy of the original table, which is filled with the data identities to be merged, without corrupting the old data identities and the final data identities in the target table. The creation of the new column in the temporary copy allows the determination of the desired behavior for each of the data identities present in the temporary copy during the table merger operation. The comparison also assists in the solution of the problem of incomplete table structures in the target table since for example physical constraints have been introduced in the temporary copy only since the original relations are integrated with application-logical relations. The chosen merge behavior (either a simple update of an already existing data identity or the import of a new data identity yet not existing in the target table) becomes particularly useful in a maintenance/update condition when an administrator needs to modify online (on the flight) some data identities with absolutely being sure that all other data identities not involved in the merge operation will be left with integrity. Furthermore, only the data entries (data tables) directly involved in the merge operation will be completely or at least partially locked (based on the database engine used). Working mainly in temporary tables, the time span in which the real database tables are locked can be reduced to a minimum. The minimal locking grants the possibility of continuously working with the database and avoids the requirement to stop completely a production process for the sake of long time consuming database merge operations.

The invention claimed is:

1. A method for importing data into a database table, which comprises the steps of:
   providing the database table with data identities, effective values of the data identities, and primary keys, wherein each one of the effective values of the data identities is assigned to a respective one of the data identities and to a respective one of the primary keys;
   providing a temporary copy of the database table having copies of the data identities in the database table and at least one data identity to be merged into the database table;

determining a table structure of the database table and a table structure of the temporary copy and comparing a determined table structure of the database table to the table structure of the temporary copy for deciding which of the data identities have to be updated in the database table only and which of the data identities have to be imported;

creating, in the temporary copy of the database table, a column having a primary key of a related data identity and a new column having a final primary key of the related data identity for a transfer of the related data identity into the database table, thereby assigning a same primary key to the data identity in the temporary copy of the database table if the data exists already in the database table and assigning a new primary key to the data identity in the temporary copy of the database table if the data identity is not present yet in the database table;

after creating the column having the primary key and the new column having the final primary key in the temporary copy of the database table, locking the data identities in the database table that are also present in the temporary copy of the database table at the time of the locking and executing an update function acting on the database table for the data identities having the same primary key in both the database table and the temporary copy of the database table and executing an import function acting on the database table for the data identities having a newly assigned primary key comprised in the new column of the temporary copy; and unlocking locked data identities after a successful execution of the update function and the import function.

2. The method according to claim 1, wherein a determination of the table structure of the database table includes a determination of physical constraints already defined in the table structure.

3. The method according to claim 1, which further comprises adding a second column to the temporary copy, the second column containing information on whether the data identity is a target for the update function or for the import function.

4. The method according to claim 1, wherein the temporary copy is a temporary copy of a child table being in relation with a father table, wherein a relation is entered into the child table for all of the data identities in the child table.

5. The method according to claim 1, wherein a determination of the table structure of the database table includes a determination of logical constraints which had been defined during a development of a database application.

6. The method according to claim 1, wherein a determination of the table structure of the database table includes a determination of physical constraints already defined in the table structure and a determination of logical constraints which had been defined during a development of a database application.

* * * * *